J. J. HEILMANN.
ARRANGEMENT FOR CONTROLLING THE STEERING WHEELS OF AUTOMOBILES.
APPLICATION FILED JULY 19, 1910.
1,144,706.
Patented June 29, 1915.
2 SHEETS—SHEET 1.
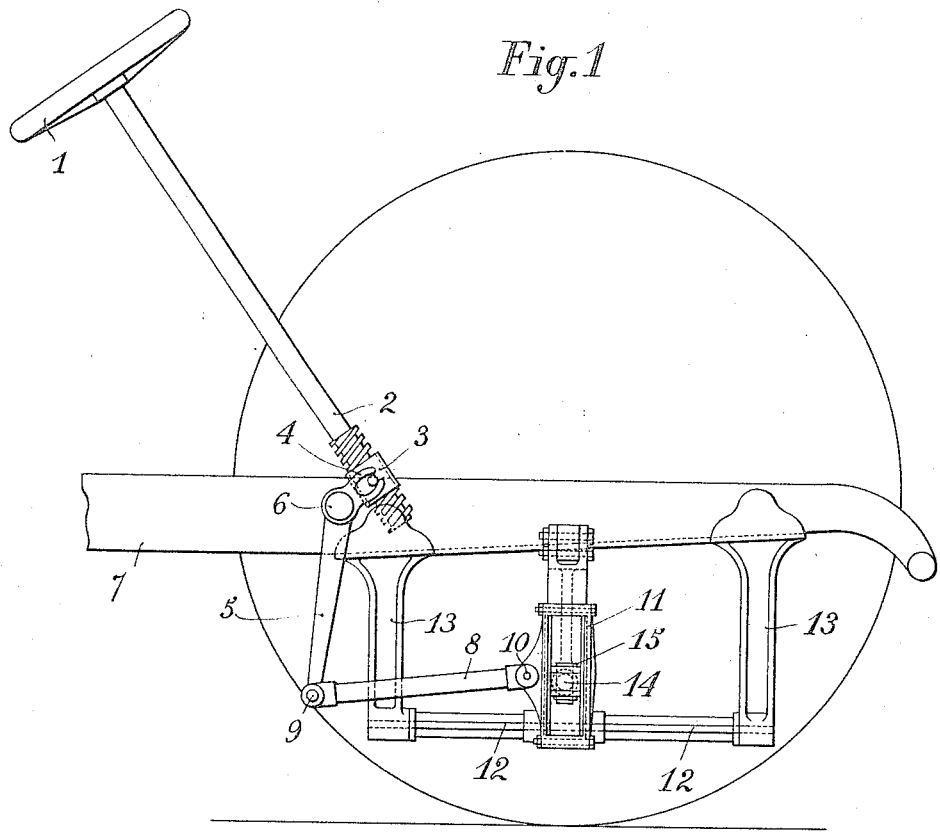
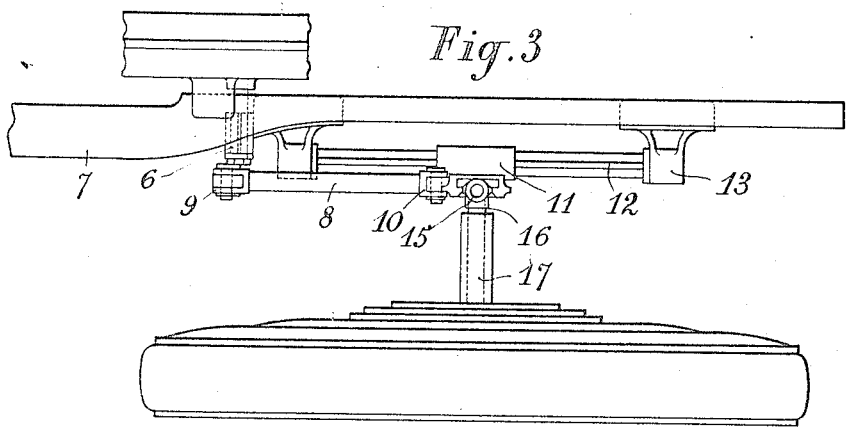
WITNESSES
INVENTOR
Jean Jacques Heilmann
By his Attorneys

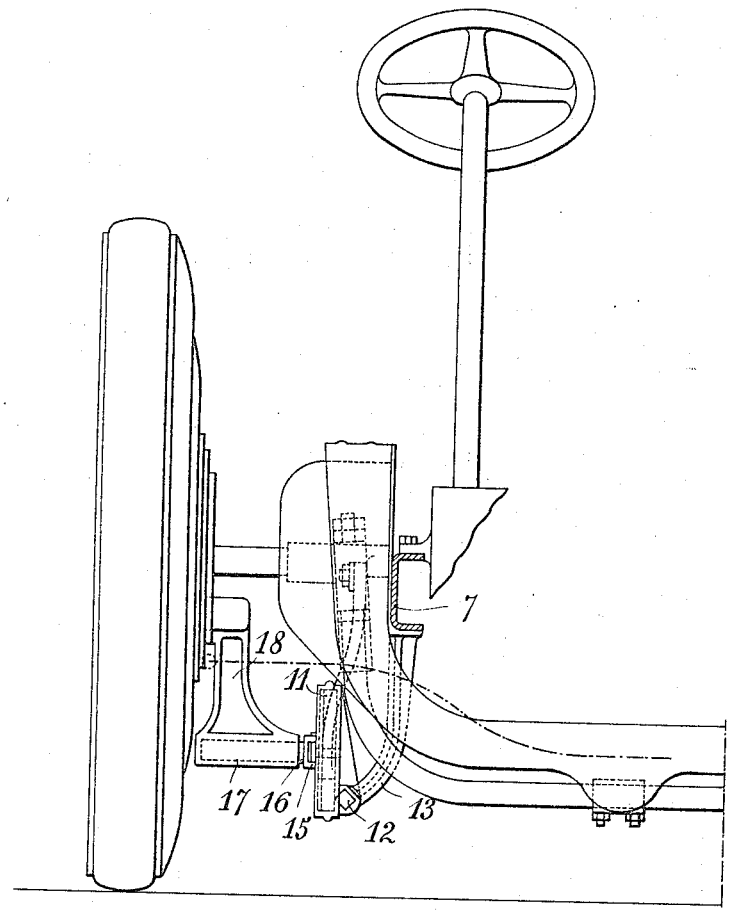

UNITED STATES PATENT OFFICE.

JEAN JACQUES HEILMANN, OF PARIS, FRANCE.

ARRANGEMENT FOR CONTROLLING THE STEERING-WHEELS OF AUTOMOBILES.

1,144,706.   Specification of Letters Patent.   Patented June 29, 1915.

Application filed July 19, 1910. Serial No. 572,686.

*To all whom it may concern:*

Be it known that I, JEAN JACQUES HEILMANN, citizen of the French Republic, residing at Paris, in the Department of the Seine, France, have invented certain new and useful Improvements in Arrangements for Controlling the Steering-Wheels of Automobiles, of which the following is a specification.

The steering gears most generally employed at the present moment for controlling the steering wheels of automobiles consist in an arrangement of levers and connecting rods joined together by ball points or Cardan joints. In spite of the most advantageous combinations, these systems offer a certain rigidity which is manifested by a rapid wearing away of the parts and even very often a sudden breaking of one of the parts.

A certain flexibility or elasticity is necessary in the connections of the parts constituting the steering gears actually in use, in order to permit the constant displacements between the wheels mounted on their shaft and the suspended chassis of the vehicle. These displacements occur irregularly, suddenly and in various and opposite directions, consequently the steering gear is often exposed to constant and varied strains and consequently cannot be absolutely exact.

The present invention refers to a system for controlling the steering wheels of automobiles of all kinds and is absolutely independent of the numerous and various actions and reactions of the chassis and steering wheel.

With this arrangement the steering of the wheels is effected in a manner absolutely independent and constant whatever may be the respective and momentary positions of the chassis and of the steering wheels. This arrangement is based on a combination of three movements imparted to three series of parts, the movement of which as a whole permits of obtaining a universal movement. These three movements comprise: a rectilineal movement parallel to the axis of the chassis, a rectilineal movement oscillating perpendicularly to the axis of the chassis and a curvilineal movement in a plane substantially horizontal and parallel to the axis of rotation of the wheel.

This arrangement is shown in the drawing annexed to the present description, in which:

Figure 1 is a side elevation, Fig. 2 is a front elevation, Fig. 3 is a plan view.

Variations and modifications in the construction of the parts as well as in the general arrangement of the system can be effected without in any way affecting the principle on which the said system is based.

Referring to the figures of the drawing, 1 is the steering wheel, 2 is the steering pillar with endless screw actuating a displaceable nut 3 which latter by means of a fork 4 actuates a bell-crank lever 5 pivoting on a spindle 6 fastened to the chassis 7 of the vehicle. 8 is a connecting rod with strap and key ends 9 and 10 connecting the lever 5 with a support slide 11 which latter can be displaced along a guide rod 12 carried by supports 13 fastened to the chassis 7. The support 11 has in its interior slide-way a movable cross-head 14 to which is pivoted by a strap 15, a rod 16 which is slidably mounted in a socket 17. This socket is carried by a part 18 which is mounted upon the vehicle wheel in such a manner that it permits the independent rotation of the latter and yet follows the turning or angular movement thereof, the socket described forming with the other elements beforementioned, an extensible or telescopic steering lever.

The whole of the component elements of this steering gear thus described will permit of understanding the working of the system. By turning the steering wheel 1 the fork 4 which causes the lever 5 to describe an arc of a circle, is caused to turn around its pivot 6 by the intermediation of the steering pillar 2 with the endless screw and the displaceable nut 3. This displacement occasions that of the connecting rod 8 moving the support slide 11 along the guide 12 in a to-and-fro rectilineal movement parallel to the axis of the chassis or base frame of the vehicle. The plunger 16 and the socket 17, which together with 18 form the extensible steering lever of the wheel, also take part in this displacement by their connection with the cross-head 14. The turning angle of the wheel always corresponds exactly with the position of the slide 11 along the guide 12 and according as the turning increases or decreases the rod 16 will automatically enter or leave more or less the socket 17. The whole of the extensible steering lever accompanies the wheel in all its vertical movements, this being rendered possible owing to the vertical displacement of the cross head 14 in the slide 11. Consequently whatever may be the position of the wheel with respect to the chassis, the turning or steering will always be exactly controlled owing to the independence of the parts forming the control arrangement, which constitutes the object of the present invention.

Having now particularly described and ascertained the nature of my said invention and in what manner the same is to be performed, I declare that what I claim is:

1. A control device for the steering wheels of a vehicle, comprising a guide carried by the frame of the vehicle, a movable member guided thereby, said member being movable substantially in parallelism with the longitudinal axis of said frame, a vertically displaceable part guided by said member, and a wheel controlling lever co-acting with said vertically displaceable part, said lever being angularly displaceable in a plane transverse to the vertical plane of the wheel.

2. A control device for steering wheels of a vehicle comprising a manually-controlled steering part, a vehicle wheel controlling lever, and means for operating said lever from said steering part, said means including a reciprocable supporting member, a guide for said member upon which said member moves substantially in parallelism with the longitudinal axis of the vehicle frame, and connections between said lever and supporting member comprising a vertically displaceable part, said part being displaced upon angular movement of the axis of rotation of the vehicle wheels with respect to the transverse axis of the vehicle frame, and connections from said steering part to said vertically displaceable part.

3. A control device for the steering wheels of a vehicle comprising a manually controlled steering part, a vehicle wheel controlling lever, and means for operating said lever from said steering part, said means including a slidable support, a cross-head slidably connected to said support and adapted for vertical movement, said cross-head and lever being pivotally connected.

4. A control device for the steering wheels of an automobile or the like, comprising a manually controlled steering part, an extensible wheel controlling lever, the elements of which are telescopically arranged in a plane substantially parallel to the transverse axis of the vehicle, one of said elements being connected to one of the vehicle wheels to permit independent rotation of the latter and to turn therewith, and means connected to the other of said elements for angularly displacing said lever in accordance with the movements of the steering part aforesaid.

5. A control device for the steering wheels of a vehicle, comprising a manually controlled steering part, a reciprocable support, means for moving said support in accordance with the movements of said steering part, and a vehicle wheel controlling lever angularly displaceable by movement of said support, said lever being connected to said support but being vertically displaceable with respect thereto by a vertical displacement of the vehicle wheels with respect to the frame of the vehicle.

6. A control device for the steering wheels of a vehicle, comprising a manually controlled steering part, a support movable forwardly and rearwardly with respect to the frame of the vehicle, a telescopic vehicle wheel lever angularly displaceable by the movements of said support and means for connecting said support and said lever, said support and lever being vertically displaceable, one with respect to the other.

7. A control device for the steering wheels of an automobile or the like which comprises mechanism whereby an automobile wheel may be angularly displaced about a substantially vertical axis, said wheel being left free to reciprocate vertically with respect to the chassis of the automobile, said mechanism comprising a guided support movable forwardly and rearwardly with respect to said chassis, a curvilinearly displaceable vehicle wheel controlling device, said controlling device being adapted for vertical movement with respect to the frame of the vehicle and a vertically displaceable element connecting said device and said support.

8. A control device, comprising a manually controlled steering part, a vehicle wheel controlling lever, and means for operating said lever from said steering part, said means including a support adapted to slide longitudinally with respect to the axis of the vehicle frame, a cross-head adapted to vertically slide in a slot in said support, said cross-head and said lever being pivotally connected.

In testimony whereof I affix my signature in presence of two witnesses.

JEAN JACQUES HEILMANN.

Witnesses:
HENRY DANBERG,
LUCIEN CRESPIN.